United States Patent [19]

Carlson et al.

[11] Patent Number: 5,025,952

[45] Date of Patent: * Jun. 25, 1991

[54] GAS RESUPPLY VALVE WITH MICROSCOPIC APERTURE AND WITH SEALING MEMBER SUPPORTED BY VALVE BODY

[75] Inventors: Lee Carlson, Pleasanton; Mike Green, San Jose; Mike Miller, Mountain View; Rudy Nissen, Pescadero; Steve Sheng, Sunnyvale, all of Calif.

[73] Assignee: Spectra-Physics, Inc., San Jose, Calif.

[ * ] Notice: The portion of the term of this patent subsequent to Jul. 11, 2006 has been disclaimed.

[21] Appl. No.: 449,244

[22] Filed: Dec. 7, 1989

Related U.S. Application Data

[63] Continuation of Ser. No. 103,231, Sep. 30, 1987, abandoned.

[51] Int. Cl.⁵ .............................................. B67D 5/00
[52] U.S. Cl. ....................................... 222/3; 222/425; 222/504; 222/512; 222/547; 251/118; 137/624.11
[58] Field of Search ................................... 251/129.17

[56] References Cited

U.S. PATENT DOCUMENTS

| | | | |
|---|---|---|---|
| 2,573,424 | 10/1951 | Flamm | 222/3 X |
| 3,190,496 | 6/1965 | Weiland | 222/3 |
| 3,525,497 | 8/1970 | Zalar | 222/3 X |
| 3,560,789 | 2/1971 | Hernquist | 372/59 X |
| 3,641,385 | 2/1972 | Oikado | 372/59 X |
| 3,820,571 | 6/1974 | Grier | 138/44 |
| 4,378,600 | 3/1983 | Hobart | 372/62 |
| 4,489,754 | 12/1984 | Seessle et al. | 251/118 X |
| 4,503,594 | 3/1985 | Gall et al. | 138/44 X |
| 4,535,812 | 8/1985 | Miller | 137/624.11 |
| 4,550,858 | 11/1985 | Noomen | 222/639 X |
| 4,629,099 | 12/1986 | Jones | 222/504 X |
| 4,649,547 | 3/1987 | Carlson et al. | 372/61 |
| 4,683,575 | 7/1987 | Carlson et al. | 372/59 |
| 4,846,440 | 7/1989 | Carlson et al. | 251/129.17 |

FOREIGN PATENT DOCUMENTS

| | | | |
|---|---|---|---|
| 2800251 | 9/1979 | Fed. Rep. of Germany | 251/129.17 |
| 1038675 | 8/1983 | U.S.S.R. | 251/129.17 |

Primary Examiner—Michael S. Huppert
Assistant Examiner—Gregory L. Huson
Attorney, Agent, or Firm—Ronald C. Fish

[57] ABSTRACT

There is disclosed herein several gas resupply valves for replenishment of lost gas in gas lasers in general and argon ion lasers in particular. The first embodiment uses a valve which controls flow of gas into a metering volume. The metering volume has an aperture therein which is microscopically small and which has a diffusion constant for gas moving through the aperture which is less than the time the valve is held open. The second embodiment uses the same general structure, but separates the soft sealing member of the valve from the solenoid core which moves to open and close the valve. The soft sealing member is attached to the valve body and supported above a valve seat surrounding the opening of the metering volume. The third embodiment uses a thin diaphragm which overlies a flat surface of the valve body in which are formed an input port and an output port. A solenoid applies pressure against the diaphragm to cause it to flatten against the flat surface thereby sealing the valve.

18 Claims, 6 Drawing Sheets

GAS RESUPPLY VALVE WITH MICROSCOPIC APERTURE AND WITH SEALING MEMBER SUPPORTED BY VALVE BODY

This application is a continuation of Ser. No. 07/103,231, now abandoned.

BACKGROUND OF THE INVENTION

The invention relates generally to the field of gas lasers which have loss mechanisms and, more particularly, to the field of gas resupply valves for such gas lasers to supply new gas to maintain gas pressure within the laser tube within acceptable limits.

In almost all gas lasers there is a loss mechanism whereby gas molecules trapped in the laser tube are lost either through leaks or through chemical combination with or sputtering into the materials on the inside of the laser tube. In the field of ion lasers, and especially in the field of argon ion lasers, the argon atoms are ionized by electrical discharges passing through the gas-filled laser tube. These ions are then excited to higher energy states by pumping energy supplied from an outside source. Although argon is a noble gas, argon ions can "sputter" into the walls of the laser tube and be lost for further laser action. Because there is a very narrow band of acceptable pressures for gas in the laser tube which will cause lasing action, it is important that the pressure of argon gas in the laser tube remain relatively constant. Thus, when argon ions are lost, pressure in the laser tube will drop. This loss of pressure can be detected by monitoring the voltage appearing across the electrodes which ionize the argon gas since the voltage drops as the pressure drops. If the lost argon ions are not replaced with new gas molecules, the laser will become unstable. If the pressure in the gas tube drops low enough, the laser will stop lasing.

In the prior art, the lost gas has been replaced by the use of gas resupply valves. These valves have small reservoirs for storing argon gas at atmospheric pressure (or any other pressure) and have metering volumes. When the pressure in the laser gets too low, the metering volume is filled with gas through a valve and this gas is then allowed to enter the highly evacuated laser tube to replenish the gas supply. The use of the metering volume allows a known quantity of gas to be injected into the laser tube on each "charging" cycle. Very tiny amounts of gas are involved in this process. This is because if too much gas is allowed to enter the laser tube, the laser can be essentially ruined since higher pressures mean higher voltages between the ionization electrodes which the power supplies are not designed to handle. When too much gas enters the tube, the tube must be sent back to a refurbishing facility for reprocessing to get the pressure back down to an acceptable level.

The requirements for a gas resupply valve for gas lasers are three. First, the valve must have a negligible leak rate when the valve is closed. This is required so that gas laser tubes which sit in inventory unused for many weeks or months do not leak gas to the extent that the laser becomes unusable or inoperative before it is ever used. A second requirement is that the valve have a lifetime of at least 1,000 cycles between open and closed positions without failure or degradation in the residual leak rate when the valve is closed. Finally, such gas resupply valves must have extremely short cycle times between opening and closing in embodiments where only one valve member and a controlled leak aperture is used. There are prior art embodiments to be discussed below which use two valve members. For these valves, it is not necessary that the cycle time be as small as noted above. But all gas resupply valves must meet the first two requirements.

An early gas resupply valve design known to workers in the art used two valve seats and two valve members. The metering volume was the volume trapped between the valve seats when the two valve members were seated on their respective valve seats. A chamber around one valve was coupled to the gas reservoir, and the other valve opened into the gas laser tube or another tube coupled thereto. In operation, the "reservoir" valve was opened for a time sufficient to cause the metering volume to fill up with replacement gas at the pressure of the reservoir. After the metering volume was full, the "reservoir" valve was closed and the second or "laser tube" valve was opened thereby allowing the gas in the metering volume to be drawn into the laser tube, which has an internal pressure much lower than atmospheric pressure, to replenish the supply of gas therein.

The difficulty with this design was that two valves and corresponding driving mechanisms were necessary. This made the valve relatively expensive, and more parts were present to fail.

In an effort to simplify this design, workers in the art eliminated one of the valves and replaced it with a capillary tube having an inside diameter of five thousandths of an inch. This capillary tube had a diffusion constant which was longer than the interval during which the first valve coupled to the reservoir was opened. The capillary tube was connected to the interior of the laser gas tube. In operation, the first valve coupled to the reservoir was opened for a very short time which was shorter than the diffusion constant of the capillary tube. During this time the replacement gas from the reservoir filled the metering volume. The diffusion constant of the capillary tube had to be long compared to the time of opening of the first valve so that the capillary tube not appear as a leak. When this was true, the metering volume appeared to have no leak therein during the time that the valve was open, and the amount of gas that entered the metering volume could be accurately predicted. After the valve was closed and the diffusion time constant had passed, the gas trapped in the metering volume leaked into the laser tube through the capillary tube to replenish the laser tube ga supply.

One difficulty with this approach was that the capillary tube was difficult to keep clean. In order to have a diffusion constant which was smaller than the open time of the valve, it was necessary to use a capillary tube with a very small inside diameter. This made it extremely difficult to keep the bore of the capillary tube clean and resulted in contaminants in the capillary tube being sucked into the laser tube. The resultant contamination caused failure of laser tubes. Another difficulty with the capillary tube design was that the capillary tube acted as a virtual leak in the laser tube during the evacuation step of the process of manufacturing the laser tube. During manufacture of a gas laser, the tube is pumped down to the desired vacuum level prior to filling it with the desired gas. The virtual leak represented by the capillary caused the time to pump the laser tube down to the necessary level to be longer than would otherwise be necessary. Those skilled in the art will appreciate that the capillary tube coupled to the metering volume appears to be a crevice in the wall of the tube which couples into a cavern. In order for the laser to be effectively evacuated, all the gas molecules in the metering volume and the capillary tube had to be pumped out through the restrictive passageway presented by the capillary tube.

Thus a need exists for a simple, reliable, relatively inexpensive gas resupply valve for gas lasers.

SUMMARY OF THE INVENTION

According to the teachings of the invention, a gas resupply valve is taught using a metering volume which uses one valve at an inlet and which has an outlet comprised of one wall which has a microscopically small aperture therein. Typically, this aperture is laser drilled and has a diameter of from 10–15 microns. The valve opens for a predetermined interval to gate gas from the gas reservoir into the metering volume. Input gas comes from a resupply gas reservoir coupled to a chamber surrounding the valve. The small aperture in the wall of the metering volume is in fluid communication with the interior of a gas laser tube such that the vacuum level in the gas laser tube is present in the metering volume at all times except when the valve is open. The gas resupply reservoir is at atmospheric pressure typically however any pressure could be used. When the valve opens, the lower pressure in the metering volume causes gas from the reservoir and the chamber surrounding the valve to enter the metering volume. However, the aperture size and length is such that the diffusion constant for gas molecules moving through this aperture into the laser tube is longer than the time during which the valve is open. Thus, the metering volume is a virtual closed cavity as long as the valve is not open for a time which is longer than the diffusion constant for the aperture.

The wall of the metering volume having the aperture therein is thin so that the length of the aperture is short. Thus the aperture has a length which is short compared to the 1 to 2 inches of capillary tube used in prior art valves. This makes the aperture far easier to clean than the prior art capillary tubes. Conventional laser drilling techniques may be used to form the aperture. Any conventional technique such as chemical machining may be used to make the aperture. The critical element is that the size and length of the aperture cause it to have a diffusion constant which is longer than the time during which the valve will be open on each "charging cycle".

After the valve is closed, the gas in the metering volume leaks into the interior of the laser tube through the aperture. The voltage across the laser tube is then monitored during operation to determine if the amount of gas metered into the laser tube is sufficient to bring the pressure back to within the desired pressure range. If the gas charge is insufficient, one or more additional gas charges is provided by cycling the valve open and closed one or more times. This process is repeated until the pressure rises to the desired pressure range and the voltage across the tube rises to the desired level.

DETAILED DESCRIPTION OF THE PREFERRED EMBODIMENT

Figure 1:
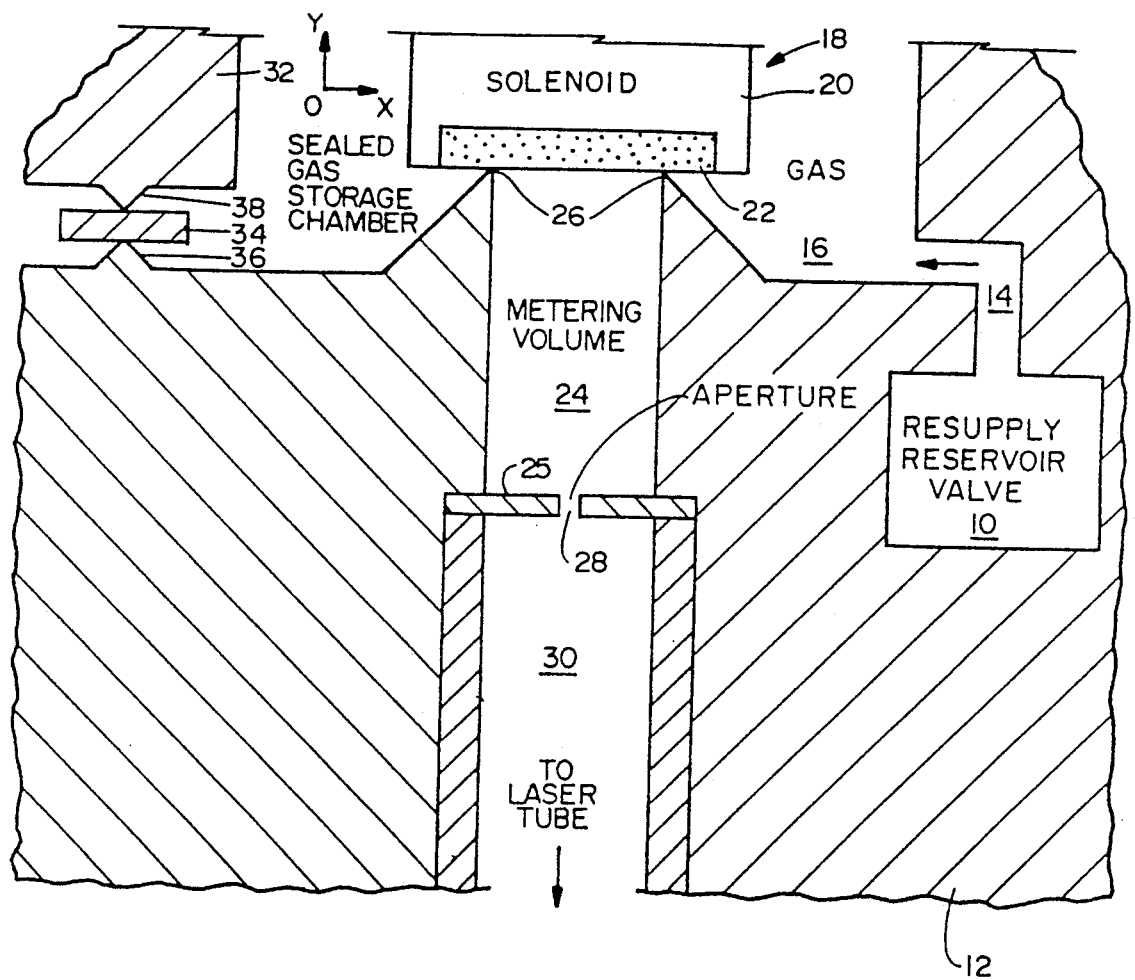
FIG. 1 is a cross sectional view of a gas resupply valve according to the teachings of the invention.

Referring to FIG. 1, there is shown a cross-section of a gas laser resupply valve having one valve and a small aperture in a wall of the metering volume. The valve is comprised of a resupply reservoir 10 which is filled with, for example, argon gas at atmospheric pressure. In the preferred embodiment, this resupply reservoir 10 can be a chamber machined in the body 12 of the valve. In other embodiments, the reservoir 10 may be coupled to the body of the valve through an external port (not shown).

The resupply reservoir 10 is coupled via a fluid passageway 14 to a chamber 16 containing a valve 18. This valve is comprised of a solenoid slug 20 and a softer material 22 on the end of the solenoid slug. The softer material must be capable of cold flow so that a seal may be formed but must be tough enough to withstand at least 1000 cycles of the valve. In the preferred embodiment, this softer material 22, which will hereafter be called the sealing member, is a polymer marketed by DuPont under the trademark CALRES.

The solenoid slug 20 is driven linearly along the y axis to open and close the valve to allow gas from chamber 16 to enter a metering volume 24. One wall of the metering volume 24 is comprised of a diaphragm 25. This diaphragm has formed therein by any known process a very small aperture 28. In the preferred embodiment, this aperture has a diameter of from 10–15 microns and is laser drilled. The thickness of the diaphragm 25 is not critical other than it must be such as to establish the diffusion time of gas moving through the length of the aperture 28 along the negative y axis. Also, the diaphragm 25 must have sufficient thickness to withstand pressures exerted on it during the short time when the metering volume has been filled with gas at atmospheric pressure and gas is leaking through the aperture 28 into the laser tube.

The valve opens when the CALRES ™ sealing member 22 leaves contact with a valve seat 26. The valve closes when the sealing member 22 again is reestablished in contact with the valve seat 26 under the influence of the solenoid slug 20. In the preferred embodiment, the solenoid slug 20 moves in the direction of the positive y axis to open the valve. Typical open times are on the order of 5 milliseconds.

The valve 18 may have a different construction in other embodiments. Further, other open times may be used for the valve 18. It is critical, however, that the open time selected be less than the diffusion time for gas moving through the aperture 28.

The gas in chamber 16 is sealed therein by a sealing member 32 which is sealed to the body 12 by a copper washer 34 and sealing ribs 36 and 38.

In operation, the valve 18 opens thereby creating a path between the sealing member 22 and the valve seat 26 through which gas from chamber 16 flows into the metering volume. The solenoid slug 20 then moves in the negative y direction thereby forcing the sealing member 22 to make sealing contact with the valve seat 26. Because the laser tube coupled to fluid communication path 30 is at low pressure, and because the gas in chamber 16 is at atmospheric pressure, gas from chamber 16 naturally flows into metering volume 24. However, the diffusion time constant of gas moving through the aperture 28 is long compared to the time during which sealing member 22 is not in contact with valve seat 26. Thus, virtually no gas escapes from the metering volume 24 into the fluid communication path 30 and the corresponding laser tube during the time the valve is open. This is important so that precise control over the amount of gas which is injected into the laser tube is maintained. If too much gas is injected, the laser tube will reach too high a pressure and be out of the optimum range for lasing action. In such a situation, there is no way to get gas out of the tube in the field, and the laser may be out of service. After the sealing member 22 has sealed the metering volume 24, the diffusion time passes and the gas trapped in the metering volume 24 escapes through the aperture 28 into the lower pressure laser tube via fluid communication path 30. This process may be repeated as many times as necessary to raise the pressure in the laser tube to within the desired pressure range and to raise the voltage across the laser tube to the desired voltage.

Figure 2:
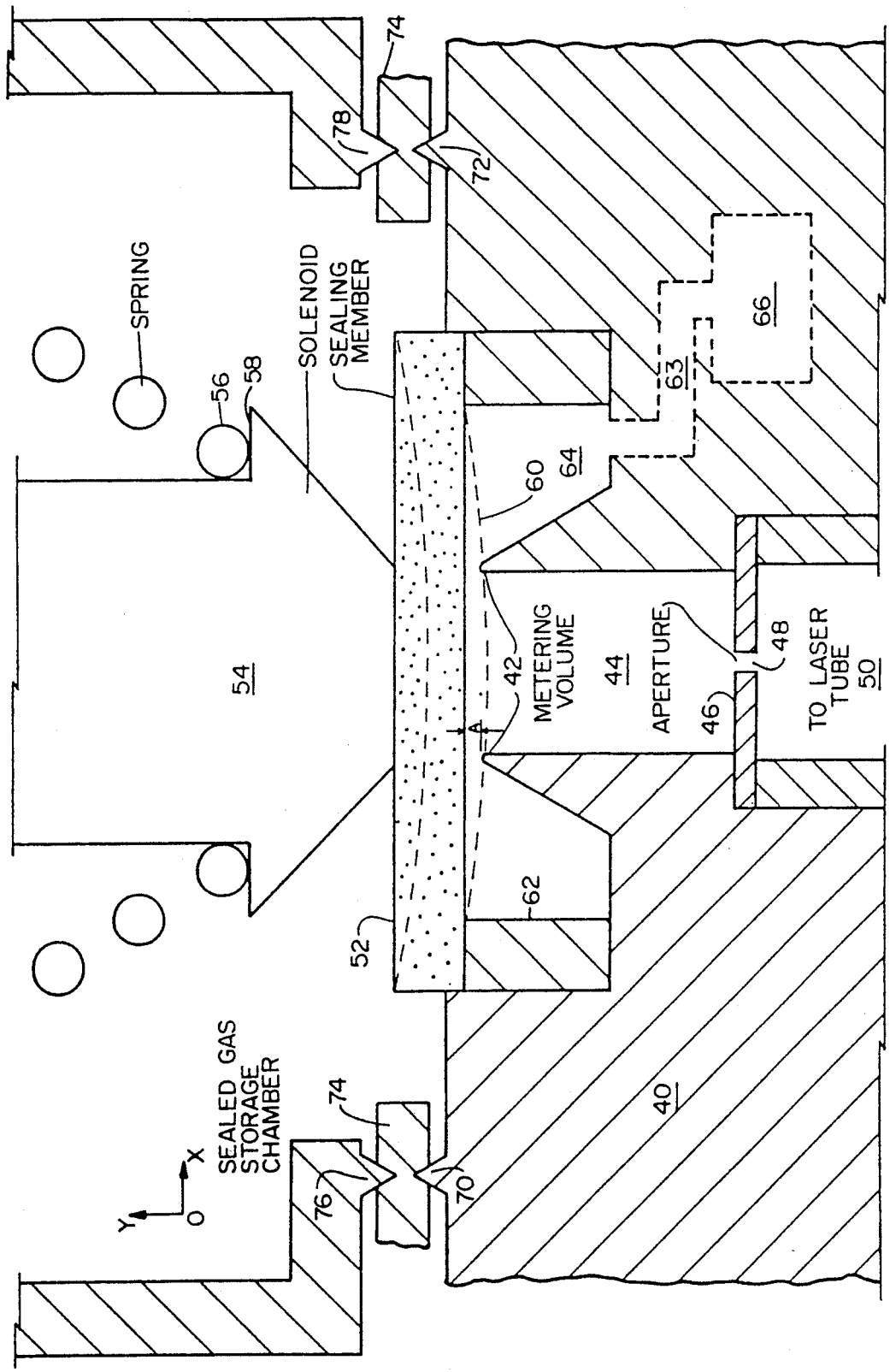
FIG. 2 is a cross sectional view of a gas resupply valve according to another embodiment of the invention.

Referring to FIG. 2, there is shown a cross-sectional view of another gas resupply valve according to the teachings of the invention. The valve is comprised of a valve body 40 which has a valve seat 42 and a metering volume 44 formed therein. The metering volume has one wall which is a diaphragm 46. This diaphragm has an aperture 48 formed therein generally by laser drilling or any other convention process that can make an aperture from 10 to 15 microns in diameter. The size of the aperture 48 is determined by the same considerations used to determine the size of the aperture 28 in FIG. 1. The aperture 48 couples the metering volume 44 to a fluid communication pathway 50. This fluid path couples the metering volume 44 to the internal volume of the laser tube.

A valve is formed by the interaction between a sealing member 52 and the valve seat 42 under the influence of forces generated by a solenoid slug 54 and a spring 56. The sealing member 52 is a flexible material capable of cold flow such as CALRES TM by DuPont. The spring 56 engages an annular shoulder 58 formed on the solenoid slug 54 and forces the slug 54 in the negative y direction. This causes the sealing member 52 to deform to the position shown in dashed lines at 60. In this position, the underside of the sealing member 52 engages the valve seat 42 with sufficient force to cause the valve seat to cause slight indentations in the sealing member 52 by cold flow. This establishes a seal. When the valve is to be opened, a solenoid coil (not shown) driven by a pulse of approximately 5 milliseconds duration causes the solenoid slug 54 to move in the positive y direction sufficiently to allow the sealing member 52 to disengage the valve seat 42. This movement to disengage the valve seat happens without any external force being applied to the sealing member 52 by virtue of the elastic properties of the sealing member. That is, the sealing member 52 must have sufficient elasticity and memory to spring back to its undeformed position from the position 60 when force by the solenoid slug is released.

Note that in FIG. 2 the sealing member 52 is not physically attached to the solenoid slug 54 whereas in the valve shown in FIG. 1, the sealing member 22 is physically attached to the solenoid slug 20. Thus, if the solenoid slug 20 wobbles or rotates during its movement in the valve of FIG. 1, the sealing member 22 will not always engage the valve seat 26 in the same relative positions on the surface of the sealing member. If this happens, the resealing of the sealing member 22 to the valve seat 26 takes somewhat longer than if the sealing member 22 always strikes the valve seat 26 at the same place.

In the valve shown in FIG. 2, the sealing member 52 is supported by a spacer ring 62 and the valve body as opposed to being supported by the solenoid slug. This means that the sealing member remains stationary even if the solenoid slug 54 wobbles, rotates or otherwise moves during its travel along the y axis. The instability of the solenoid slug results quite frequently since a very loose fit between the solenoid slug and its support is necessary to keep friction acting on the slug down. This is necessary because of the very small opening time of the slug, i.e., on the order of 5 milliseconds. If too much friction is present, the cycle time to open and close the valve will be longer than the diffusion time constant. This means that the sealing member 52, when deformed to the position 60, always has the valve seat 42 strike the undersurface of the sealing member at the same location. This results in the cold flow indentations in the sealing member 52 being engaged with the tips of the valve seat 42 as a perfect match. That is, the cold flow indentations in the undersurface of the sealing member 52 will be perfectly matched in shape to the tips of the valve seat 42. The perfect match results because the tips of the valve seat cause the cold flow indentations in the first place. Because the sealing member 52 always maintains its position relative to the tips of the valve seat 42, the valve seat never has to form new indentations in the undersurface of the sealing member 52. This improves the resealing time from approximately 20 milliseconds for the valve shown in FIG. 1 to approximately 1 millisecond for the valve shown in FIG. 2. The resealing time is the interval between the time when the sealing member 52 first contacts the valve seat 42 to the time when gas flow into the metering volume 44 ceases.

The spacer ring 62 is engaged in a well 64 formed in the valve body 40 and serves to hold the sealing member 52 above the valve seat 42 in the positive y direction by a small distance. This distance is shown as dimension A in FIG. 2. It should be not so great that the sealing member 52 is incapable of deforming far enough to engage the valve seat 42. But the distance should be large enough to allow the metering volume 44 to fill rapidly during the 5 milliseconds or so that the sealing member 52 is not engaged with the valve seat 42 during a charging cycle.

The valve body 40 also has formed therein a gas reservoir 66 which is coupled to the well 64 by a gas passageway 68. The gas reservoir 66 stores a volume of gas which is identical to the gas in the laser tube. This gas is stored at atmospheric pressure generally.

The valve body 40 has sealing teeth 70 and 72 (actually this is one annular tooth) which engage a copper sealing washer 74. The surface of the sealing washer 74 having the most positive y coordinate is engaged by sealing teeth of 76 and 78 of a cap member (not shown) which forms a gas tight chamber surrounding the metering volume 44, the sealing member 52 and the solenoid slug 54. Thus, if any gas in well 64 gets past the sealing member 52 to the vicinity around the solenoid 54, that gas is trapped in the structure.

In operation, when a recharge cycle is to be performed, a short pulse, generally 5 milliseconds in duration, is applied to the solenoid coil which drives the solenoid slug 54 in the positive y direction. This disengages the sealing member 52 from the valve seat 42 thereby allowing gas at atmospheric pressure in well 64 to fill the metering volume 44. No gas escapes through the aperture 48 into the fluid passageway 50 since the diffusion time constant for gas moving through the aperture 48 is longer than the time which the valve is open. After the pulse to the solenoid coil returns to zero voltage, the spring 56 exerts a force on the annular shoulder 58 sufficient to cause the solenoid slug 54 to move in the negative y direction. This causes a force on the sealing member 52 which causes it to deform to the position 60. This closes the valve and cuts off fluid communication with the well 64. A known amount of gas is then trapped in the metering volume since the volume of this chamber is known and it is known that no gas could have escaped through the aperture during the 5 millisecond fill time. Gas trapped in the metering volume 44 then leaks through the aperture 48 into the lower pressure laser tube via passageway 50. This process is repeated as many times as necessary to raise the pressure in the laser tube to within the desired pressure range.

Figure 3:
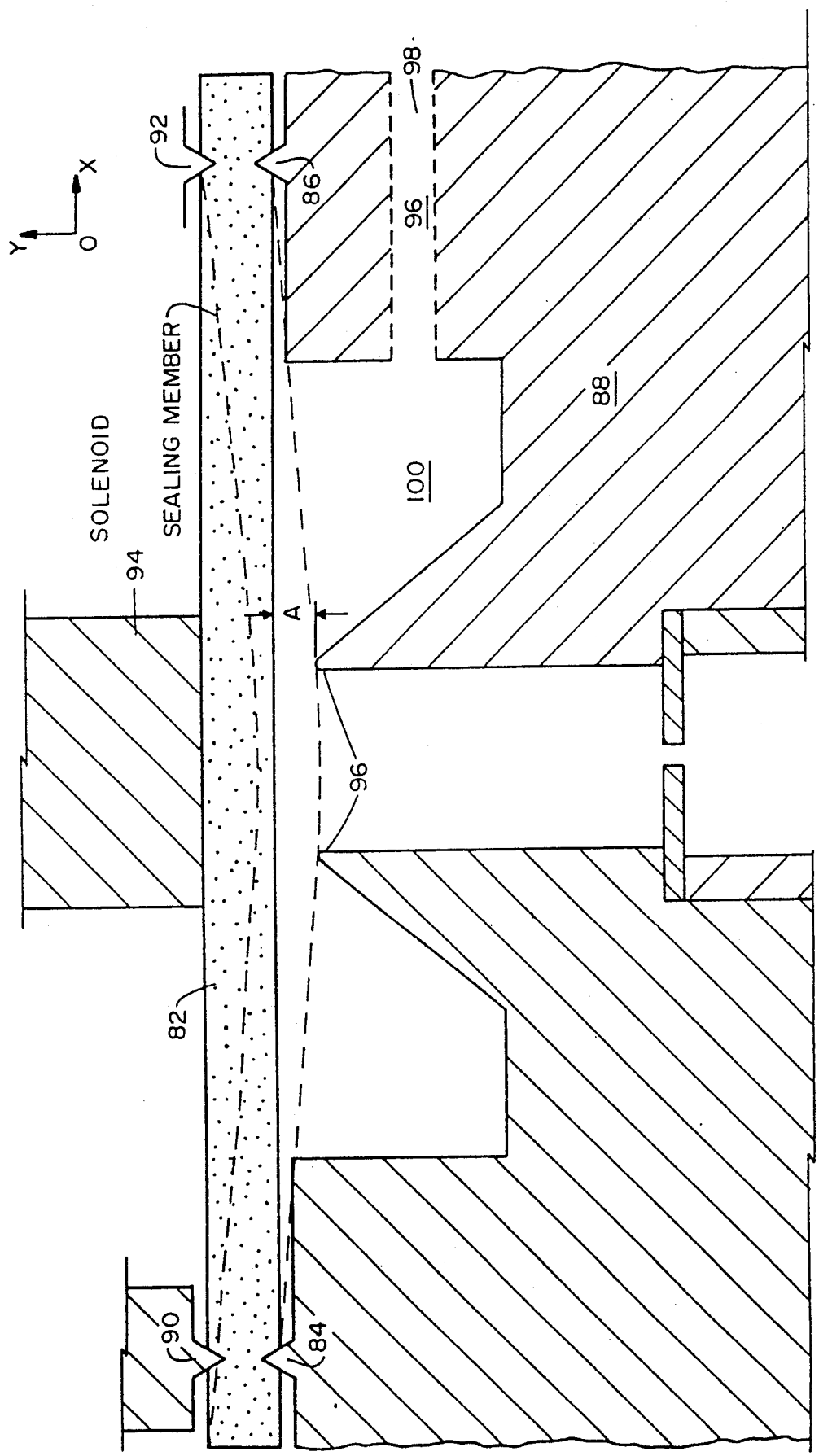
FIG. 3 is a cross sectional view of a gas resupply valve according to the preferred embodiment of the invention.

Referring to FIG. 3, there is shown another embodiment of the valve of FIG. 2. The main difference between the embodiment shown in FIG. 3 and the embodiment shown in FIG. 2 is that the sealing member 82 is not supported by a spacer ring such as the spacer ring 62 in FIG. 2. Instead, the sealing member 82 is engaged with the sealing teeth 84 and 86 of the valve body 88 on the undersurface and engaged with sealing teeth 90 and 92 on the upper surface. Sealing teeth 90 and 92 are part of a cap (not shown) which encloses the entire valve to form a gas tight seal. Also, the solenoid slug 94 does not have an annular shoulder thereon such as the shoulder 58 in the valve of FIG. 2. However, the solenoid slug 94 could be formed with the same configuration as the solenoid slug 54 in FIG. 2. Other means of applying pressure in the negative y direction to the sealing member 82 may also be used. Note also that the valve body has a gas passageway 96 formed therein to conduct gas from an external port 98 coupled to an external gas reservoir (not shown) to the internal chamber 100. Note that the sealing member 82 is physically engaged by the sealing teeth 84, 86, 90 and 92 and therefore is fixed in position relative to the valve seat 96. Therefore, if the solenoid slug 94 wobbles, rotates or otherwise moves during its movements along the y axis, the sealing member 82 does not move relative to the x axis during the process of engaging the valve seat 96. Thus, the advantages of the embodiment of FIG. 2 over that of FIG. 1 are also achieved in the embodiment shown in FIG. 3. The resealing time of the embodiment of FIG. 3 is comparable to the embodiment of FIG. 2.

In both the embodiments of FIGS. 2 and 3, the distance A between the underside of the sealing members and the valve seat is approximately 10 to 15 thousandths of an inch.

Figure 4:
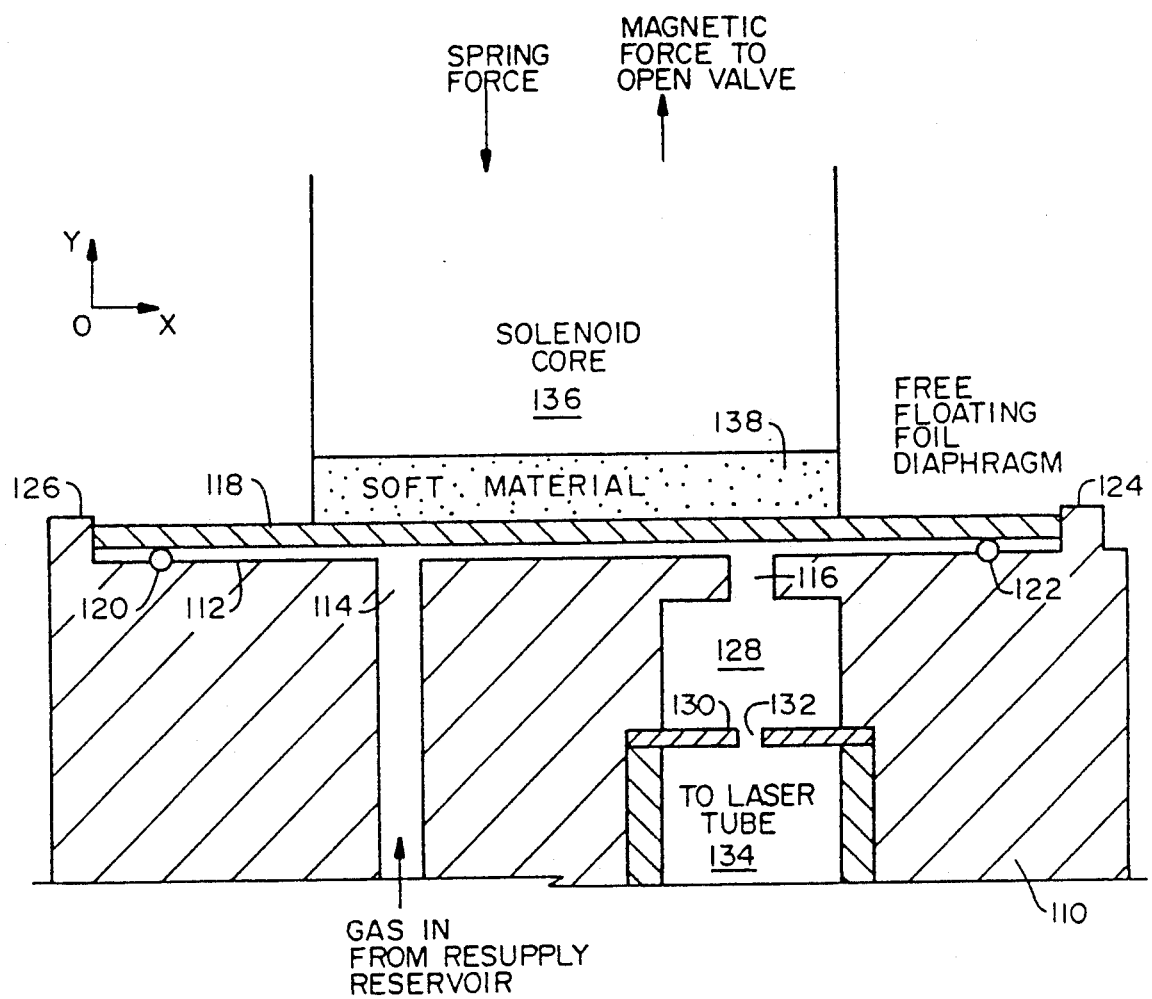
FIG. 4 is a cross sectional view of a gas resupply valve having a flat metal diaphragm according to another embodiment of the invention.

Referring to FIG. 4 there is shown in cross-section another valve construction for a gas resupply valve according to the teachings of the invention. In this embodiment a valve body 110 has a flat upper surface 112 which has two ports 114 and 116 formed therein. The surface 112 may be ground flat and does not have to be optically flat. The port 114 serves as an input port for gas while the port 116 serves as an output port. A 5 mil thick foil diaphragm 118 rests on the surface 112 and is supported at sealing rings 120 and 122 which are in fact a single rubber sealing ring in the preferred embodiment. Movement of the diaphragm 118 in the x direction is restrained by retaining walls 124 and 126 in the preferred embodiment. With a circular valve construction, the retaining walls 124 and 126 are in fact a single annular retaining wall.

The port 116 serves as an inlet port to a metering volume 128. The metering volume 128 has one wall which is a diaphragm 130 in which is formed an aperture 132. This diaphragm 130 and the aperture 132 serve the same purpose as the diaphragms and apertures in the valves of FIGS. 1-3. The metering volume is in fluid communication with the laser tube through the aperture 132 and a fluid communication path 134.

A solenoid core 136 having a soft material 138 formed on the end thereof serves to open and close the valve in a manner to be described below. The soft material 138 can be CALRES TM by DuPont or any other soft material such as rubber, or soft metals such as brass or aluminum. Preferably, the materials for all elements in the valve of FIG. 4 should have a high melting point. For this reason, an all metal structure is preferred. Thus brass is the preferred material for the element 138. The reason for this preference is that during the construction of a gas laser, during the pump down stage where the laser tube is evacuated, it is desirable to heat the tube to as high a temperature as possible to speed up the process. This aids in removal of gas molecules trapped in crevasses in the surface of the metal inside the tube and in removing the monolayer of gas atoms which adhere to the walls of the metal inside the tube. The increased thermal activity of the atoms decreases the diffusion time for gas molecules coming out of crevasses and decreases the time it takes to liberate the monolayer gas atoms from the walls of the internal structure of the laser tube. Since the gas resupply valve is already attached to the laser tube during this process, it too is subjected to high temperatures. Therefore the presence of any polymers or other materials which cannot withstand the high temperatures of the bake process are undesirable.

In operation, the valve of FIG. 4 is initially sealed, thereby preventing gas flow from port 114 into the metering volume 128. This sealing occurs when the solenoid slug 136 is moved in the negative y direction thereby forcing the soft material 138 against the diaphragm 118. The force exerted upon the diaphragm causes it to comes down upon and conforms to the contour of the surface 112 thereby forming a seal. This is the reason that the surface 112 should be as flat as possible although perfect flatness is not necessary. This is also the reason that the diaphragm 118 should be relatively thin. The only criteria is that the flatness of the surface 112 and the thinness of the diaphragm 118 combine to make a seal which is adequate to meet the requirement that there be a negligible leak rate when the valve is closed. In the preferred embodiment, this seal was experimentally found to be better that $1 \times 10^{-10}$ liters per minute leak rate.

To recharge the laser tube when the pressure therein drops too low, the solenoid core 136 moves in the positive y direction for a short time such as 5 milliseconds. This allows the elastic diaphragm 118 to spring back to its original shape thereby creating a passageway for gas flow between the port 114 and the port 116 between the diaphragm 118 and the surface 112. This fills the metering volume 128. Since the diffusion time constant of the aperture 132 is short relative to the time that this passageway is open, no gas leaks into the laser tube during the time that the gas flow pathway between port 114 and port 116 is open. After the metering volume is filled, the solenoid core 136 again moves in the negative y direction thereby sealing the metering volume 128 from further gas input. Thereafter, the gas trapped in the metering volume 128 is drawn into the laser tube through the aperture 132 and the fluid communication path 134.

Figure 5:
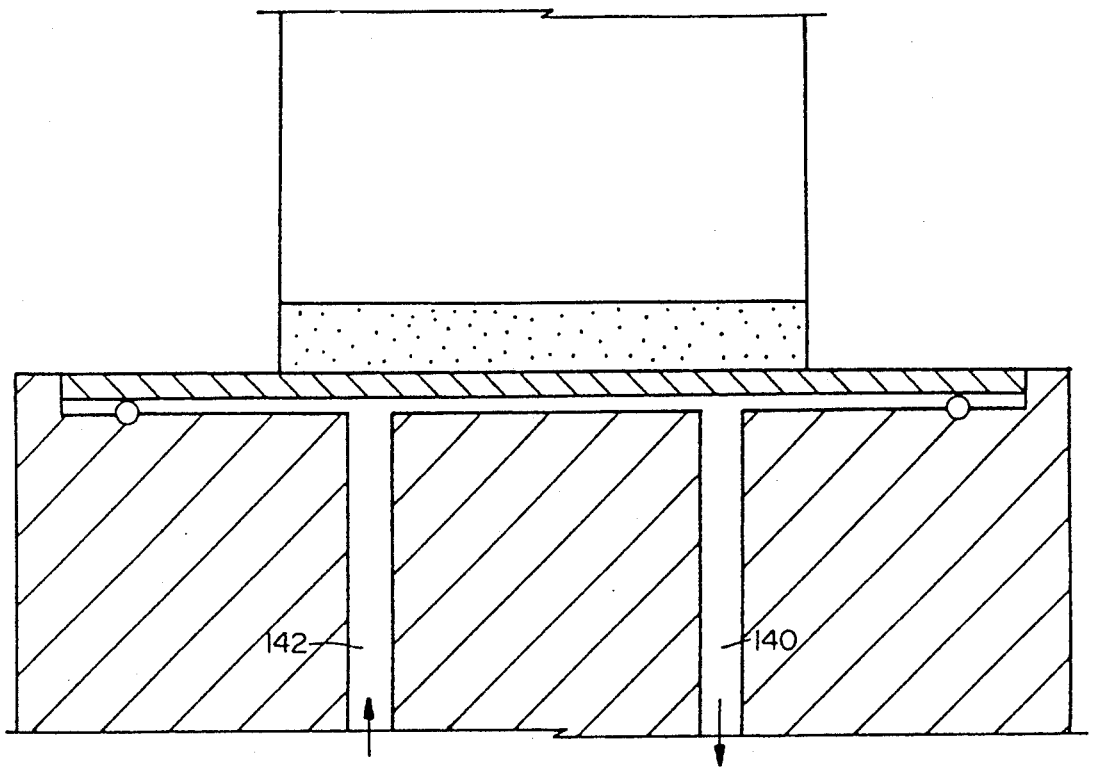
FIG. 5 is a cross sectional view of a valve having a flat metal diaphragm according to another embodiment of the invention useful outside the field of gas lasers.

Referring to FIG. 5, there is shown a cross-section of another valve built according to the principles of the valve of FIG. 4 except the metering volume 128 and the diaphragm 130 and aperture 132 are replaced by a single output port 140. All other structures are the same and serve the same purpose. Thus the structure of FIG. 5 is a simple valve having a gas input port 142 and a gas output port 140. Of course, other materials than gas can be controlled using the valve of FIG. 5 such as liquids. If corrosive liquids are to be handled, materials must be selected for the valve structures which come into contact with the liquid which cannot be damaged by the liquid. Those skilled in the art will appreciate the selection of materials necessary to such applications.

Figure 6:
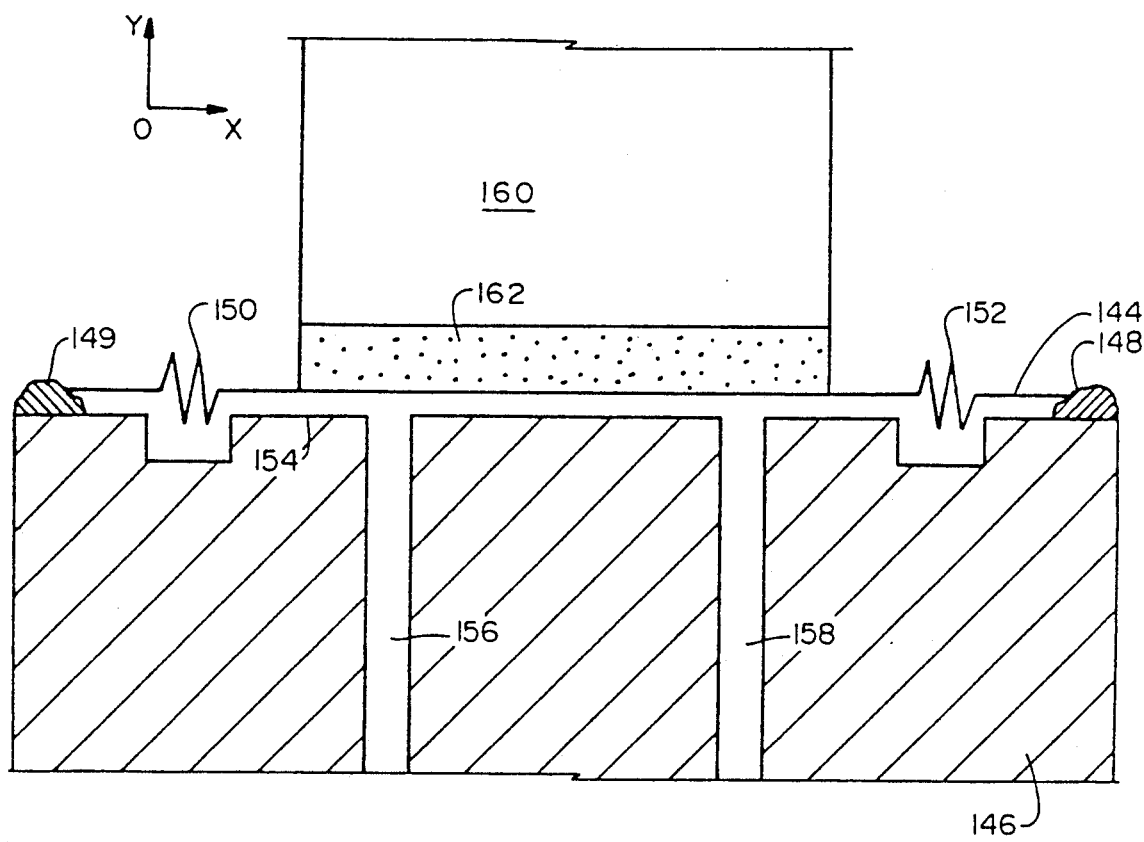
FIG. 6 is a cross sectional view of a valve having a flat metal diaphragm which attached to the valve body at welds and which has folds in the diaphragm to relieve stresses of any origin which might cause the diaphragm to bow.

Referring to FIG. 6, there is shown another embodiment of a valve according to the principles shown in FIGS. 4 and 5. In this valve, the principle difference is that the diaphragm 144 is permanently attached to the valve body 146 by welds 148 and 150. These welds can also be braised connections or other forms of connection suitable for connecting the material of the diaphragm 144 to the material of the valve body. In FIG. 6, the diaphragm 144 is shown as a single line. The diaphragm 144 has bellows 150 and 152 formed therein. The purpose of these bellows is to allow for differences in the rates of thermal expansion and contraction between the diaphragm 144 and the valve body 146. Such differences could cause the diaphragm 144 to bow away from the flat surface 154 of the valve body 146 under certain conditions. In other words, the diaphragm 144 could bow up and away from the surface 154 in the positive y direction under certain circumstances. This bowing action could make it impossible to properly seal the valve between input port 156 and output port 158. The bellows 150 and 152 can expand or contract to account for these differences thereby maintaining the relative relationship in the y direction between the diaphragm 144 and the surface 154.

In the embodiment of FIG. 6, a single simple output port 158 is shown. However, those skilled in the art will appreciate that the single output port 158 may be configured as a metering volume/diaphragm/aperture/fluid communication path as shown in FIG. 4 at 128, 130, 132 and 134 respectively. Such a configuration would make the valve of FIG. 6 suitable for use in gas resupply to gas lasers having loss mechanisms.

In operation, the valve works the same way as the valves shown in FIGS. 4 and 5 in that solenoid core 160 moves in the negative y direction to force soft material 162 against the diaphragm 144 thereby causing it to contact the flat surface 154 and seal the valve. This prevents any fluid flow between the input port 156 and the output port 158. When the valve is to be opened, the solenoid core 160 is moved in the positive y direction thereby allowing the diaphragm 144 to move in the positive y direction and opening a fluid communication path between the port 156 and the port 158.

Although the invention has been described in terms of the multiple embodiments disclosed herein, those skilled in the art will appreciate many modifications which may be made to these structures to utilize the concepts disclosed herein without departing from the true spirit and scope of the invention. All such modifications, substitutions and other equivalents to structures are intended to be included within the scope of the claims appended hereto.

What is claimed is:

1. A gas resupply apparatus for a gas laser having a gas therein comprising:

a valve body;

a metering volume formed in said valve body having an opening and having a valve seat formed integrally with a wall forming a circumference of said opening and having at least one wall which has an aperture formed therein;

a gas storage chamber for storing said gas and formed in said valve body so as to surround said opening of said metering volume;

a sealing member formed of a material having elasticity and capable of cold flow and capable of forming a seal with said valve seat, said sealing member for deforming so as to form a seal with said valve seat when force is applied to said sealing member and, when force is removed, for moving out of sealing engagement with said valve seat under the influence of the elasticity of said sealing member, thereby allowing said gas from said sealed gas storage chamber to enter said metering volume;

a sealing member support surrounding said valve seat and sized for supporting said sealing member in a position such that when external force is not applied to said sealing member, said sealing member is not in sealing engagement with said valve seat, but such that, when external force is applied to said sealing member, said sealing member is close enough to said valve seat to deform under the influence of said force so as to come into sealing engagement with said valve seat;

means for applying force to said sealing member to cause it to stay deformed and in sealing engagement with said valve seat, and, upon receipt of a control signal, for removing force from said sealing member to allow said sealing member to unseat itself from said valve seat thereby allowing said metering volume to fill with said gas from said gas storage chamber, said control signal for removing said force so as to unseal said metering volume for a predetermined time interval;

said aperture in said metering volume having a size relative to said diffusion constant of said gas and the gradient of concentration between gas molecules in said metering volume and said laser such that no appreciable amount of said gas escapes from said metering volume during said predetermined time interval when said metering volume is being filled; and a fluid communication path means formed in said valve body for providing a path for said gas in said metering volume to leave said metering volume through said aperture and to be guided into said laser.

2. The apparatus of claim 1 wherein said sealing member is a polymer.

3. The apparatus of claim 1 further comprising a resupply gas reservoir formed in said body and in fluid communication with said gas storage chamber via a second fluid communication path.

4. An apparatus as defined in claim 1 wherein said means for applying force is comprised of a solenoid having an electrical winding and having a core, said core having an annular shoulder, and further comprising a spring engaging said annular shoulder for applying force to said core to cause it to move in a direction so as to cause said core to engage said sealing member to deform said sealing member so as to enter sealing engagement with said valve seat, said winding being coupled to said control signal for generating magnetic flux acting upon said core so as to cause said core to move so as to reduce the force applied by said spring to said sealing member sufficiently to allow said sealing member to resume its undeformed state thereby breaking said sealing engagement with said valve seat.

5. The apparatus of claim 4 wherein said core is cylindrical except at an end which engages said sealing member and wherein the end which engages said sealing member has the cross section of a cylindrical arrowhead truncated near the point of said arrowhead to form a flat, round surface, said arrowhead defining said annular shoulder wherein said spring engages said annular shoulder, and wherein said flat, round surface on said core produced by said truncation contacts said sealing member and is larger than the area circumscribed by said valve seat, and wherein said solenoid is positioned so that said flat, round surface of said core produced by said truncation of said cylindrical arrowhead overlies the portion of said sealing member which contacts said valve seat when said sealing member is deformed by force exerted by said core to cause sealing engagement between said sealing member and said valve seat.

6. A valve for supplying replacement gas to a gas filled laser comprising:
a valve body;
a gas storage chamber formed in said valve body for storing replacement gas;
a metering volume formed in said valve body comprising a cavity which has one diaphragm wall which has an aperture therein, said cavity having an opening into said gas storage chamber the perimeter of said opening defining a valve seat;
solenoid means for sealing said metering volume by engaging a sealing member coupled to said solenoid with said valve seat and, in response to the activation of a control signal, for unsealing said opening of said cavity surrounded by said valve seat for a predetermined cycle time, and then for resealing said opening such that a predetermined volume of said replacement gas enters said metering volume;
said aperture being sized relative to said replacement gas to provide a diffusion constant of said replacement gas through said aperture such that for a range of gradients between the concentration of said replacement gas in said metering volume and the concentration of gas in said laser substantially all the gas which enters said metering volume during said cycle time is still in said metering volume when said metering volume is resealed; and
an exit path for guiding gas leaving said metering volume through said aperture to an exit port coupled to said laser.

7. An apparatus for resupplying gas to a gas laser comprising:
a valve body;
a metering volume formed in said valve body having an opening, and having a valve seat formed integrally with a wall forming a circumference of said opening, and having at least one wall which has an aperture formed therein;
a gas storage chamber formed in said valve body so as to surround said opening of said metering volume, said chamber for storing gas;
sealing means including a gasket member for engaging said valve seat and formed of a material capable of cold flow and capable of forming a seal with said valve seat, said sealing means for moving said gasket member into sealing engagement with said valve seat and, when a control signal is received, for moving said gasket member out of sealing engagement with said valve seat and, upon receipt of a second control signal, for moving said gasket member back into sealing engagement with said valve seat thereby defining a cycle time during which said metering volume is filled with gas; and
wherein said aperture is sized relative to the diffusion constant of said gas and the concentration gradient of said gas from said metering volume to said laser such that no appreciable amount of gas escapes from said metering volume through said aperture during said cycle time; and
a fluid communication path means formed in said valve body for providing a path for gas in said metering volume to leave said metering volume through said aperture and be guided to an exit port coupled to said laser.

8. A valve comprising:
a valve body;
a flat surface on said valve body having first and second openings and a retaining wall formed around said flat surface;
an inlet port in fluid communication with said first opening;
an outlet port in fluid communication with said second opening;
a groove formed in said flat surface so as to completely surround said first and second openings;
a sealing ring in said groove;
a flexible diaphragm resting on said sealing ring and supported in a position away from said flat surface by said sealing ring thereby leaving a space between said diaphragm and said flat surface which forms a fluid communication path between said inlet port and said outlet port and retained by said retaining wall;
means for imposing sufficient force on said diaphragm to deform it so as to make sealing contact with said flat surface so as to cut off the fluid communication path between said inlet port and said outlet port while force is being applied, and wherein said flexible diaphragm has sufficient resiliency to move out of sealing contact with said flat surface when force is not being applied.

9. A valve comprising:
a valve body;
a flat surface on said valve body having first and second openings and a groove formed therein completely encircling said first and second openings;
an inlet port in fluid communication with said first opening;
an outlet port in fluid communication with said second opening;
a flexible diaphragm having edges which are permanently affixed by means for fastening to the perimeter of said flat surface so as to form a seal completely encircling said first and second openings, said flexible diaphragm held by said means for fastening in a position away from said flat surface so as to form a space defining a fluid path between said first and second openings, and having bellows formed therein to allow expansion and contraction of said diaphragm; and
means for selectively applying a force to said diaphragm to deform it into sealing engagement with said flat surface so as to cut off said fluid path between said first and second openings.

10. The apparatus of claim 9 wherein said means for applying force is a solenoid having a core with a material having cold flow properties affixed to said core at the position where the core contacts said diaphragm, said soft material having sufficient pliability to cause said diaphragm to conform to any imperfections in said flat surface for better sealing.

11. An apparatus for resupplying gas to a laser comprising:
a valve having a closed-to-open-to-closed cycle time; and
a metering volume having an opening controlled by said valve and having one wall in which is formed an aperture having a size relative to the diffusion constant for the particular gas in said laser and the concentration gradient between gas in said laser and gas in said metering volume such that substantially no gas escapes through said aperture during said closed-to-open-to-closed cycle time.

12. An apparatus as defined in claim 11 wherein said valve comprises:
a solenoid having a slug and a coil, said slug being moved by the electromagnetism generated by a coil;
a valve seat; and
a sealing member interposed between said valve seat and said slug so that when said slug is moved toward said valve seat, said sealing member is forced by said slug to engage said valve seat and form a seal.

13. The apparatus of claim 11 wherein said sealing member is a resilient material whereby the quality of sufficient durability to withstand at least 1000 cycles of operation of the valve without degradation of sealing ability is achieved.

14. The apparatus of claim 13 further comprising a valve body in which said metering volume is formed, said sealing member forming a seal with said valve seat when said slug is moved toward said valve seat, and wherein said valve seat is formed around said opening of said metering volume.

15. An apparatus as defined in claim 14, further comprising a flow channel in fluid communication with said aperture to conduct fluid escaping through said aperture out of said apparatus.

16. An apparatus as defined in claim 14 wherein said valve seat is cylindrical and wherein said core is a solid cylinder of ferromagnetic material and has a cross sectional area greater than the area circumscribed by said valve seat.

17. The apparatus of claim 14 wherein said slug is configured as a cylindrically shaped shaft terminated by a round tip in the form of a solid cone with the pointed end begin truncated, the intersection of said cylindrical shaft and said cone forming an annular shoulder, and the truncation of said pointed end being at such a level in said cone that the area of the surface of said cone coincident to the plane of truncation is greater than or equal to and of the same approximate shape as the area of said valve seat.

18. An apparatus as defined in claim 17 further comprising a spring engaging said annular shoulder to bias said core to force said sealing member into sealing engagement with said valve seat at all times except when said coil of said solenoid is energized to open said valve.

* * * * *